(12) United States Patent
Gowlla et al.

(10) Patent No.: US 12,537,785 B2
(45) Date of Patent: Jan. 27, 2026

(54) SYSTEMS AND METHODS FOR USING CLUSTERING MODELS TO MANAGE RESOURCES FOR PROCESSING MESSAGES

(71) Applicant: Capital One Services, LLC, McLean, VA (US)

(72) Inventors: Lavanya Gowlla, Bangalore (IN); Lavanya Raja, Bangalore (IN); Priyam Jain, Bangalore (IN); Puneet Goyal, Bangalore (IN); Ajay Syamaladevi, Bangalore (IN); Aniruddh Premdas, Bangalore (IN); Roshni Singh, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 23 days.

(21) Appl. No.: 18/774,831

(22) Filed: Jul. 16, 2024

(65) Prior Publication Data
US 2026/0025349 A1    Jan. 22, 2026

(51) Int. Cl.
*G06F 15/16* (2006.01)
*H04L 51/21* (2022.01)
*H04W 24/02* (2009.01)

(52) U.S. Cl.
CPC ............ *H04L 51/21* (2022.05); *H04W 24/02* (2013.01)

(58) Field of Classification Search
CPC .............................. H04L 51/21; H04W 24/02
USPC ........................................................ 709/206
See application file for complete search history.

(56) References Cited

U.S. PATENT DOCUMENTS

| | | | |
|---|---|---|---|
| 6,728,748 B1 * | 4/2004 | Mangipudi | H04L 67/1023 718/105 |
| 8,732,363 B2 * | 5/2014 | Shimamura | G06T 1/60 711/201 |
| 2023/0396561 A1 * | 12/2023 | Radi | H04L 49/356 |

* cited by examiner

*Primary Examiner* — Alicia Baturay
(74) *Attorney, Agent, or Firm* — Foley & Lardner LLP

(57) ABSTRACT

Systems and methods for using clustering models to manage resources for processing messages are described herein. For example, the system may receive first messages from users. The system may process the first messages using a model to sort the first messages into a set of groups. The system may then receive second messages from the users. The system may identify, in the second messages, an increase in volume of messages sorted into a first group. The system may identify two related groups having a combined message volume below a threshold volume. The system may update the model to sort messages into an updated set of groups such that the two related groups form a combined group and such that the first group is separated into two groups. The system may then process the second messages using the updated model to sort the second messages into the updated set of groups.

20 Claims, 8 Drawing Sheets

400

| 403 | 406 | 409 | 412 |
|---|---|---|---|
| <msg> | <msg> | <msg> | <msg> |
| <msg> | <msg> | <msg> | <msg> |
| <msg> | <msg> | | |
| <msg> | <msg> | | |

450

| 403 | 406 | 409 | 412 |
|---|---|---|---|
| <msg> | <msg> | <msg> | <msg> |
| <msg> | <msg> | <msg> | <msg> |
| <msg> | <msg> | | |
| <msg> | <msg> | | |
| <msg> | | | |
| <msg> | | | |

SYSTEMS AND METHODS FOR USING CLUSTERING MODELS TO MANAGE RESOURCES FOR PROCESSING MESSAGES

SUMMARY

Platforms may sort incoming messages into groups according to topic so that each group of messages may be directed to an appropriate processor for resolution. The number of groups may be limited by a number of processors available to process messages, and each processor may be able to handle a certain number or frequency of messages. However, certain scenarios may cause an influx of messages sorted into a particular group. For example, following a release of a product update, messages relating to product support may increase drastically. The processor handling messages relating to product support may be unable to handle the increase in frequency. Thus, a mechanism is desired for using clustering models to manage resources for message processing.

Methods and systems are described herein for using clustering models to manage resources for processing messages. A resource management system may be built and configured to perform operations discussed herein. The resource management system may receive a first set of messages from users via a messaging platform. The resource management system may use a model to sort the first set of messages into a set of groups, where the set of groups corresponds to a set of resources available to process messages. For example, if there are four resources (e.g., processors) available to process and respond to the messages, the resource management system may use the model to sort the first set of messages into four groups. The resource management system may then receive a second set of messages from the users via the messaging platform. Comparing the second set of messages with the first set of messages, the resource management system may identify, in the second set of messages, an increase in volume of messages sorted into a certain group as compared to the first set of messages. The increase in volume sorted into the certain group may overwhelm the processor assigned to process messages in that group. Thus, the resource management system may redefine the groups to counteract the surge of messages sorted into that group. The resource management system may identify, from the set of groups, at least two related groups having a combined message volume below a threshold volume. The resource management system may update the model to sort messages into an updated set of groups such that the at least two related groups form a combined group and the first group is separated into at least two separate groups. The resource management system may then use the updated model to sort the second set of messages into the updated set of groups. This process allows the resource management system to adjust groups used to sort incoming messages to manage message flow to the available resources.

In some embodiments, the resource management system may receive, via a messaging platform, a first set of messages from users. The messages may require processing, such as determining an issue or question posed in each message and responding to the issue or question. In some embodiments, the first set of messages may relate to a number of topics. For example, the messages may relate to various issues or questions about a product. Topics may include security, privacy, features, troubleshooting, billing, accounts, or other topics.

The resource management system may use a clustering model to sort the first set of messages into a set of groups. The clustering model may be trained to sort messages into the set of groups according to topic. The set of groups may correspond to a number of resources available to process messages. For example, a resource may be a processor, a human, an algorithm, or another resource able to process messages. There may be a limited number of resources available to process messages at any given time. For example, there may be four resources (e.g., processors) available to process and respond to the messages. The clustering model may thus sort the first set of messages into four groups. In some embodiments, each group may include messages that are more related to other messages within the group than messages in other groups.

The resource management system may receive, via the messaging platform, a second set of messages from the users. The second set of messages may include messages received at a different time than the first set of messages. In some embodiments, the second set of messages may relate to similar topics as the first set of messages. For example, the messages may relate to various issues or questions about the same product.

The resource management system may identify, in the second set of messages, an increase in volume of messages sorted into a particular group as compared to the first set of messages. For example, following a product update, the resource management system may experience an increase in volume of messages relating to product support. The increase in volume sorted into the particular group may overwhelm the processor assigned to process messages for that group.

The resource management system may redefine the groups to counteract the surge of messages sorted into that group. For example, the resource management system may identify, from the set of groups, at least two related groups having a combined message volume below a threshold volume. For example, the resource management system may identify two groups having related topics and a low combined message volume. In some embodiments, the resource management system may determine relatedness between groups using a distance metric. The distance metric may measure similarity between groups sorted by the clustering model. In some embodiments, the resource management system may determine that two groups are related if the distance metric is below a threshold distance.

The resource management system may update the clustering model to sort messages into an updated set of groups after redefining the groups. For example, the at least two related groups may form a combined group and the first group may be separated into at least two separate groups. As an illustrative example, the resource management system may combine two groups (e.g., relating to accounts and billing) that are related and have a combined message volume below a threshold. The resource management system may then separate the particular group (e.g., relating to product support) into two groups. The same number of processors may thus be able to handle an influx of messages relating to a particular topic (e.g., product support) following an event (e.g., a product update). The resource management system may then process the second set of messages using the updated clustering model to sort the second set of messages into the updated set of groups.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 illustrates a set of groups of messages, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
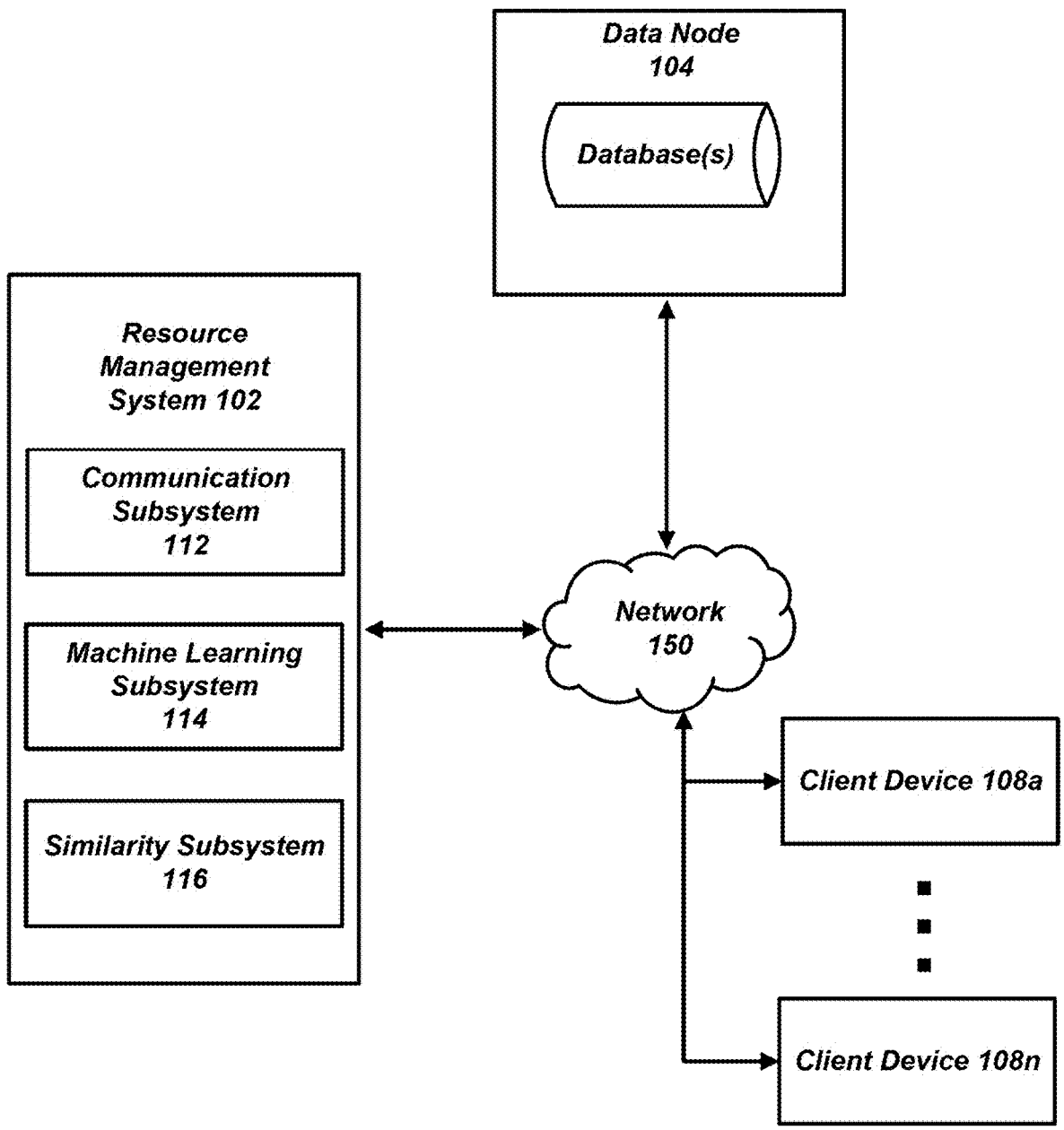
FIG. 1 shows an illustrative system for using clustering models to manage resources for processing messages, in accordance with one or more embodiments.

FIG. 1 shows an illustrative system 100 for clustering models to manage resources for processing messages received via one or more messaging platforms, in accordance with one or more embodiments. System 100 may include resource management system 102, data node 104, and client devices 108a-108n. Resource management system 102 may include communication subsystem 112, machine learning subsystem 114, similarity subsystem 116, and/or other subsystems. In some embodiments, only one user device may be used, while in other embodiments, multiple user devices may be used. The client devices 108a-108n may be associated with one or more users or one or more user accounts. In some embodiments, client devices 108a-108n may be computing devices that may receive and send data via network 150. Client devices 108a-108n may be end-user computing devices (e.g., desktop computers, laptops, electronic tablets, smartphones, and/or other computing devices used by end users). Client devices 108a-108n may (e.g., via a graphical user interface) run applications, output communications, receive inputs, or perform other actions.

Resource management system 102 may execute instructions for using clustering models to manage resources for processing messages. Resource management system 102 may include software, hardware, or a combination of the two. For example, communication subsystem 112 may include a network card (e.g., a wireless network card and/or a wired network card) that is associated with software to drive the card. In some embodiments, resource management system 102 may be a physical server or a virtual server that is running on a physical computer system. In some embodiments, resource management system 102 may be configured on a user device (e.g., a laptop computer, a smart phone, a desktop computer, an electronic tablet, or another suitable user device).

Data node 104 may store various data, including one or more machine learning models, training data, communications, and/or other suitable data. In some embodiments, data node 104 may also be used to train machine learning models. Data node 104 may include software, hardware, or a combination of the two. For example, data node 104 may be a physical server, or a virtual server that is running on a physical computer system. In some embodiments, resource management system 102 and data node 104 may reside on the same hardware and/or the same virtual server/computing device. Network 150 may be a local area network, a wide area network (e.g., the Internet), or a combination of the two.

Resource management system 102 (e.g., machine learning subsystem 114) may include or manage one or more machine learning models. Machine learning subsystem 114 may include software components, hardware components, or a combination of both. For example, machine learning subsystem 114 may include software components (e.g., application programming interface (API) calls) that access one or more machine learning models. Machine learning subsystem 114 may access training data, for example, in memory. In some embodiments, machine learning subsystem 114 may access the training data on data node 104 or on client devices 108a-108n. In some embodiments, the training data may include entries with corresponding features and corresponding output labels for the entries. In some embodiments, machine learning subsystem 114 may access one or more machine learning models. For example, machine learning subsystem 114 may access the machine learning models on data node 104 or on client devices 108a-108n.

Machine learning subsystem 114 may include one or more clustering models. Clustering models may group entities in such a way that entities in the same group (or cluster) are more similar to each other than to those in other groups. Clustering models may employ various algorithms to identify these clusters, such as K-means, hierarchical clustering, or DBSCAN. In the case of K-means clustering, the model may begin with a set number of clusters and iteratively assign each data point to the nearest cluster center, refining these centers as it minimizes within-cluster variances. Hierarchical clustering may begin by treating each data point as a separate cluster and then repeatedly merge the clusters based on a similarity metric until all points are unified into a single cluster or until a desired number of clusters is reached. DBSCAN, on the other hand, may classify points as core points, border points, or outliers based on density, thus forming clusters that may vary in shape and size.

Figure 2:
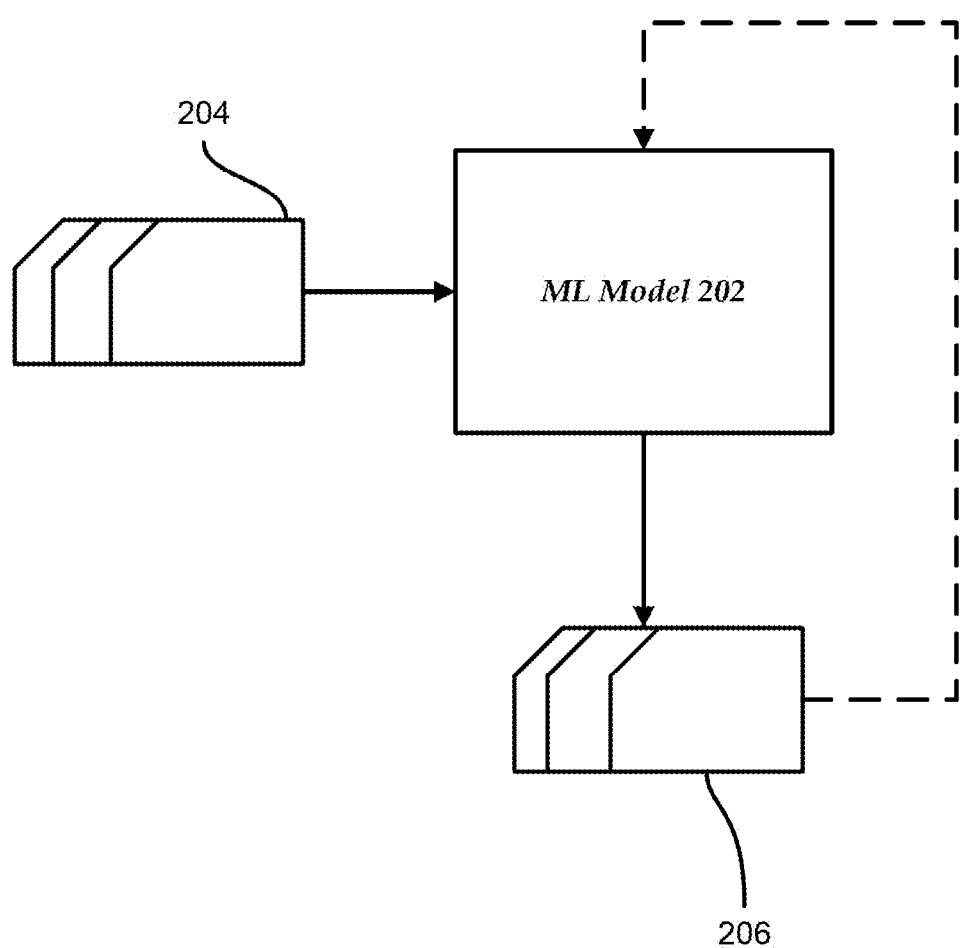
FIG. 2 illustrates an exemplary machine learning model, in accordance with one or more embodiments.

FIG. 2 illustrates an exemplary machine learning model 202, in accordance with one or more embodiments. In some embodiments, machine learning model 202 may be included in machine learning subsystem 114 or may be associated with machine learning subsystem 114. As an example, machine learning model 202 may represent a clustering model or another type of model. Machine learning model 202 may take input 204 and may generate outputs 206. The output parameters may be fed back to the machine learning model as inputs to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem-solving as compared to computer programs that do not use machine learning. During training, an output layer of the machine learning model may correspond to a classification of the machine learning model, and an input known to correspond to that classification may be input into an input layer of the machine learning model during training. During testing, an input without a known classification may be input into the input layer, and a determined classification may be output.

In some embodiments, resource management system 102 (e.g., communication subsystem 112) may receive a first plurality of messages. In some embodiments, communication subsystem 112 may receive the first messages via a messaging platform. For example, a messaging platform may include instant messaging platforms such as WhatsApp and Telegram, which may offer real-time text, voice, and video communication and may include features like file sharing and end-to-end encryption. In some embodiments, a messaging platform may include social media messaging systems, such as Facebook Messenger or Instagram Direct, which may integrate messaging with broader social networking features, allowing users to connect and interact within the context of their social media profiles. In some embodiments, a messaging platform may include enterprise messaging platforms like Slack and Microsoft Teams, which may be tailored for business environments, supporting not only messaging but also project management functions, integration with work-related applications, and tools for collaborative teamwork. Additionally, email platforms like Gmail and Outlook may serve as communication tools in both personal and professional settings, facilitating longer-form communication with capabilities for handling attachments and complex message formatting.

In some embodiments, communication subsystem 112 may receive the first messages from a plurality of users. For example, the users may be associated with a particular environment or organization associated with the messaging platform. As an illustrative example, the users may be customers of an organization and may use the products or services of the organization. As an example, the users may be employees affiliated with an organization. In some embodiments, the users may be otherwise associated with the environment or organization associated with the messaging platform.

In some embodiments, the first messages may relate to a plurality of topics. For example, a topic may relate to customer service. Users may seek assistance with product issues or service inquiries directly through real-time messaging. Product support may be another topic, involving discussions about product functionalities, troubleshooting steps, and maintenance tips. Billing-related messages may raise questions concerning invoices, payment methods, or refunds. Account-related messages may relate to personal information or account status updates. In some embodiments, messages may relate to the topic of security, such as questions relating to login information or hacked accounts. In some embodiments, messages may relate to privacy or other data-related concerns. In some embodiments, topics may be specific to a product or service relating to the environment or organization. In some embodiments, topics may be specific to a sector relating to the environment or organization.

Resource management system 102 (e.g., machine learning subsystem 114) may process the first plurality of messages to sort the first plurality of messages into a set of groups. In some embodiments, machine learning subsystem 114 may process the first plurality of messages using a clustering model (e.g., machine learning model 202, as shown in FIG. 2). In some embodiments, the clustering model may be trained to sort messages into the set of groups according to the plurality of topics. For example, the clustering model may employ a variety of machine learning techniques to analyze and categorize the content of each message. The model may begin by extracting key features from the text, such as keywords, phrases, or semantic representations, which may involve converting text into word embeddings. Once feature extraction is complete, the model may apply a clustering algorithm, such as K-means, hierarchical clustering, or DBSCAN (e.g., as discussed in greater detail in relation to FIG. 2), to group messages. The clustering model may determine clusters by measuring the similarity or distance between the feature vectors of each message. For example, messages that contain similar terms or discuss similar topics may be grouped closer together in the feature space. The model may also refine these clusters iteratively, adjusting the parameters or the method of similarity measurement to enhance the accuracy and relevance of the groups. For instance, using an iterative approach such as K-means, the model may continuously adjust the centroids of each cluster until the placement of messages within clusters minimizes intra-cluster variance and maximizes inter-cluster distinction. In some embodiments, the number of clusters may be predetermined. For example, the number of clusters may correspond to a number of resources available to process the messages. For example, the resources may be computers, machine learning models (e.g., large language models), humans, or other resources. In some embodiments, there may be a limited number of these resources available to process messages, and the clustering model may determine the clusters such that the number of clusters is equal to or less than the number of resources available to process the messages.

Figure 3:
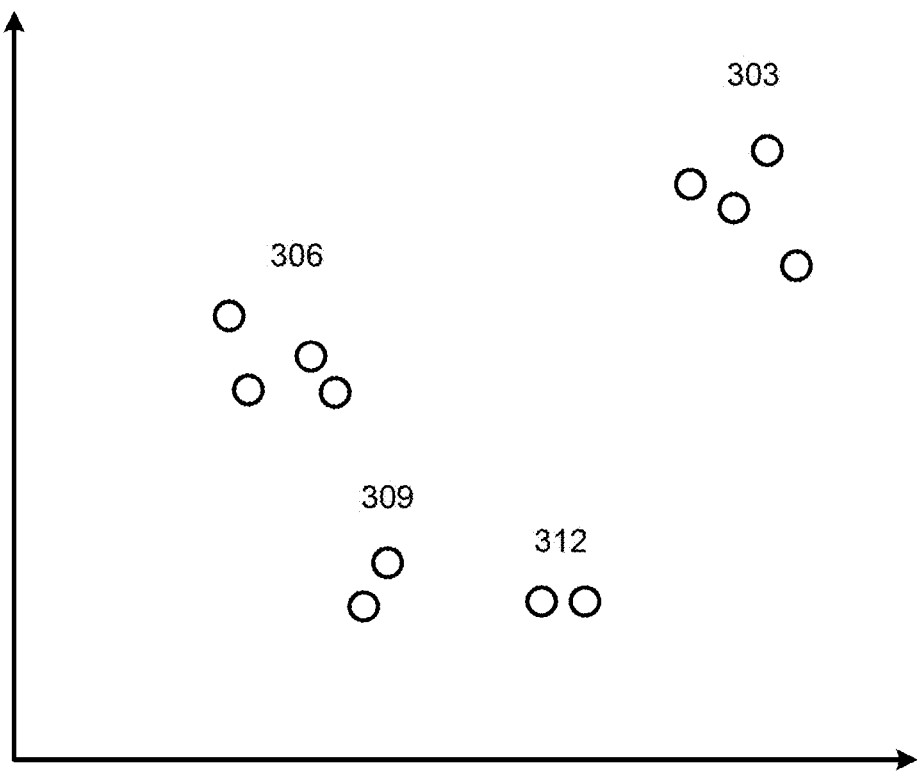
FIG. 3 illustrates clusters of messages, in accordance with one or more embodiments.

FIG. 3 illustrates clusters 300 of messages, in accordance with one or more embodiments. For example, clusters 300 may be formed by a clustering model included in machine learning subsystem 114. In some embodiments, the clustering model may form a number of clusters according to a number of resources available to process messages. As illustrated in FIG. 3, the clustering model may form four clusters according to four resources being available to process messages. In some embodiments, each cluster may include messages that are related to other messages within the cluster and that are different from other messages in other clusters. As an illustrative example, cluster 303 may include messages relating to product support, cluster 306 may include messages relating to security, cluster 309 may include messages relating to billing, and cluster 312 may include messages relating to user accounts.

FIG. 4 illustrates a set 400 of groups of messages, in accordance with one or more embodiments. For example, set 400 may include group 403, group 406, group 409, and group 412 of messages. In some embodiments, group 403 may correspond to cluster 303, group 406 may correspond to cluster 306, group 409 may correspond to cluster 309, and group 412 may correspond to cluster 312. In some embodiments, each group may include a label describing the messages included within the group. For example, group 403 may be labeled "Product Support," group 406 may be labeled "Security," group 409 may be labeled "Billing," and group 412 may be labeled "Accounts." As shown in set 400, group 403 and group 406 may each include four messages and group 409 and group 412 may each include two messages. In some embodiments, the number of messages shown in set 400 may represent a number of messages in each group at a given time, from a first wave of messages, before a change, or at another point in time. In some embodiments, the number of messages shown in set 400 may represent a frequency of messages in each group.

In some embodiments, machine learning subsystem 114 may assign labels to each group determined by the clustering model. For example, labels may be assigned to each group to facilitate easier identification and retrieval. The labeling process may involve analyzing the content of the messages within each cluster to identify common themes or keywords that describe the group's overall subject matter. For example, machine learning subsystem 114 may analyze one or more messages within the group to determine one or more topics that are relevant to the one or more messages within the group. Machine learning subsystem 114 may then assign, to the group, a label that reflects the one or more topics. In some embodiments, machine learning subsystem 114 may use representative messages from each cluster to determine the most fitting label. For example, clusters containing frequent discussions about troubleshooting software may be labeled as "Tech Support," while those discussing terms of service may be labeled "Policy Inquiries." The labeling process may also leverage natural language processing (NLP) tools to extract frequent terms or phrases from each cluster, which may then be used to automatically suggest potential labels.

In some embodiments, communication subsystem 112 may receive, via the messaging platform, a second plurality of messages from the plurality of users. The second plurality of messages may include messages received at a different time than the first plurality of messages. In some embodiments, the second plurality of messages may relate to similar topics as the first plurality of messages. For example, the second plurality of messages may, like the first plurality of messages, relate to product support, security, billing, and user accounts. In some embodiments, the second plurality of messages may relate to slightly different topics. For example, the second plurality of messages may include several messages about privacy instead of security. In some embodiments, the second plurality of messages may include different topics than the first plurality of messages.

Resource management system 102 (e.g., similarity subsystem 116) may identify, in the second plurality of messages, a change in a first group of the set of groups as compared to the first plurality of messages. For example, the change may be an increase in the volume of messages sorted into a first group of the set of groups as compared to the first plurality of messages. In some embodiments, the increase in volume may be caused by an update to a functionality relating to a first topic associated with the first group. As an illustrative example, following a product update, communication subsystem 112 may experience an increase in volume of messages relating to product support (e.g., group 403 of set 450 of groups of messages, as shown in FIG. 4). The increase in volume sorted into the particular group may overwhelm a processor assigned to process messages for that group.

Similarity subsystem 116 may identify, from the set of groups, at least two related groups having a combined message volume below a threshold volume. For example, the threshold volume may be predetermined or may be relative to an overall volume of messages received by communication subsystem 112. In some embodiments, similarity subsystem 116 may determine relatedness between two groups by calculating a distance metric. The distance metric may measure similarity between groups sorted by the model. The distance measure may be a Euclidean distance, where the distance between two points is the square root of the sum of the squared differences between corresponding elements. For example, Euclidean distance may be computed between centroids or some representative points of the clusters. In the context of Euclidean space, the closer two points or clusters are to each other, the more similar they are. In some embodiments, similarity subsystem 116 may calculate another type of distance measure between clusters. In some embodiments, similarity subsystem 116 may determine the at least two related groups having a distance metric below a threshold distance. In some embodiments, similarity subsystem 116 may assess both combined volume and relatedness to identify the two related clusters. For example, similarity subsystem 116 may select two groups that are less similar but have a lower combined volume over two groups that are more similar but have a higher combined volume, or vice versa. In some embodiments, similarity subsystem 116 may rely on only combined volume, relatedness, or another metric. In some embodiments, similarity subsystem 116 may use other methods to identify the two related groups.

Returning to FIG. 3, similarity subsystem 116 may assess two related groups. For example, similarity subsystem 116 may identify two clusters that have a distance metric that indicates relatedness between the two clusters. Similarity subsystem 116 may calculate a Euclidean distance between each cluster and each other cluster. Similarity subsystem 116 may determine that cluster 306 (e.g., relating to security) and cluster 309 (e.g., relating to billing) have a low Euclidean distance (e.g., indicating similarity) and cluster 309 (e.g., relating to billing) and cluster 312 (e.g., relating to user accounts) also have a low Euclidean distance (e.g., indicating similarity). Similarity subsystem 116 may determine a combined volume of both pairs of clusters. In some embodiments, cluster 306 and cluster 309 may have a combined volume of six messages, while cluster 309 and cluster 312 have a combined volume of four messages. In some embodiments, similarity subsystem 116 may identify cluster 309 and cluster 312 as the two related clusters to combine based on the assessment of both combined volume and relatedness.

Machine learning subsystem 114 may update the clustering model to sort messages into an updated set of groups. For example, machine learning subsystem 114 may update the clustering model such that the at least two related groups form a combined group and such that the first group is separated into at least two separate groups. As an example, the updated set of groups may combine cluster 309 (e.g., relating to billing) and cluster 312 (e.g., relating to user accounts), as shown in FIG. 3. The updated set of groups may separate the first group (e.g., relating to product support) into two groups. In some embodiments, machine learning subsystem 114 may form an updated set of groups that combines more than two groups, combines multiple pairs or sets of groups, separates the first group into more than two groups, or makes other updates to the set of groups. In some embodiments, to separate the first group into at least two groups, machine learning subsystem 114 may cause the clustering model to sort messages in the first group into at least two groups according to subtopics within the topic of the first group. For example, if the topic of the first group is product support, machine learning subsystem 114 may cause the clustering model to sort messages into a first group for troubleshooting and a second group for questions about features.

In some embodiments, machine learning subsystem 114 may analyze one or more messages within each updated group to determine updated topics that are relevant to the messages within each updated group. Machine learning subsystem 114 may then assign, to each updated group, a label that reflects the one or more topics. In some embodiments, machine learning subsystem 114 may use representative messages from each updated group to determine the most fitting label. For example, clusters containing frequent discussions about troubleshooting software may be labeled as "Tech Support," while those discussing terms of service may be labeled "Policy Inquiries." The labeling process may also leverage natural language processing (NLP) tools to extract frequent terms or phrases from each cluster, which may then be used to automatically suggest updated labels.

Figure 5:
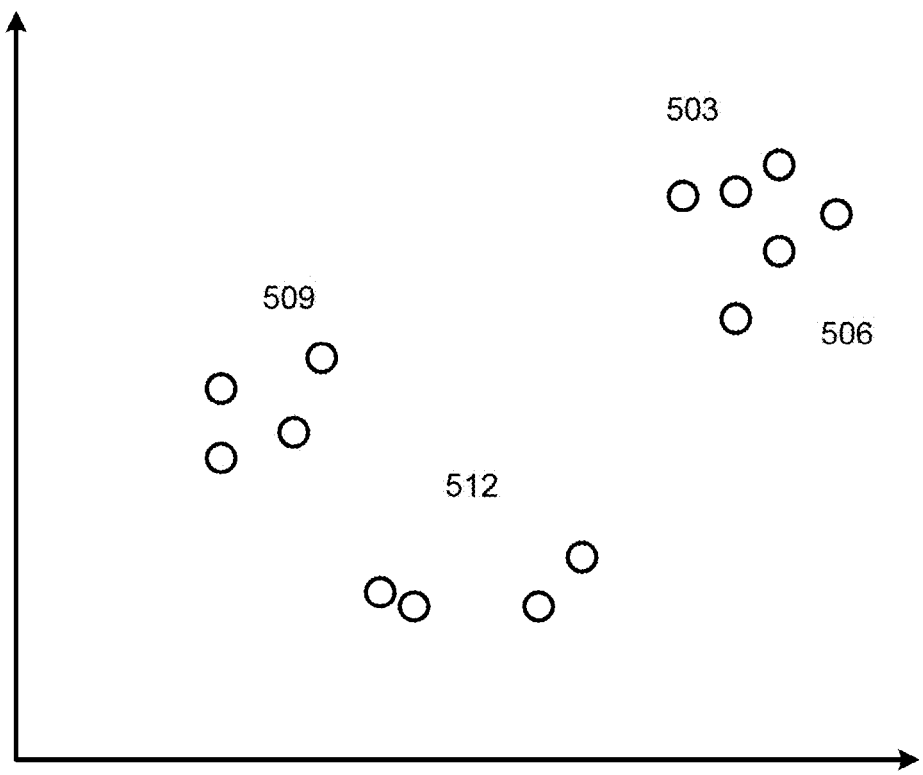
FIG. 5 illustrates updated clusters of messages, in accordance with one or more embodiments.

FIG. 5 illustrates updated clusters 500 of messages, in accordance with one or more embodiments. In some embodiments, updated clusters 500 may represent a second plurality of messages received by communication subsystem 112. In some embodiments, updated clusters 500 may include cluster 503, cluster 506, cluster 509, and cluster 512. In some embodiments, cluster 503 and cluster 506 may represent two clusters separated from a first cluster (e.g., cluster 303, as shown in FIG. 3). In some embodiments, cluster 512 may represent a combined cluster (e.g., cluster 309 and cluster 312, as shown in FIG. 3). In some embodiments, cluster 503 may relate to troubleshooting (e.g., a subsystem-topic of product support), and cluster 506 may relate to features (e.g., a subsystem-topic of product support). Cluster 509 may relate to security, and cluster 512 may relate to billing and user accounts.

Figure 6:
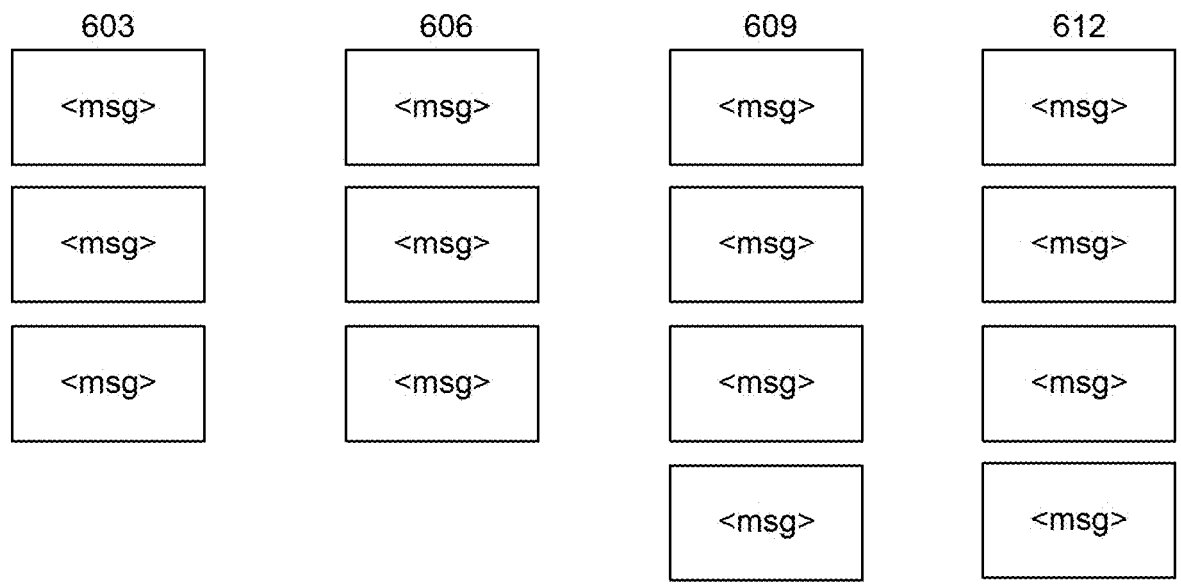
FIG. 6 illustrates an updated set of groups of messages, in accordance with one or more embodiments.

FIG. 6 illustrates an updated set 600 of groups of messages, in accordance with one or more embodiments. For example, group 603 may correspond to cluster 503, group 606 may correspond to cluster 506, group 609 may correspond to cluster 509, and group 612 may correspond to cluster 512. In some embodiments, group 603 and group 606 may each relate to a subtopic of group 403, as shown in FIG. 4. For example, group 403 may be labeled "Product Support," whereas group 603 may be labeled "Troubleshooting" and group 606 may be labeled "Product Features." In some embodiments, updated set 600 may include the same number of groups as set 400 (e.g., based on a number of resources available to process messages). In some embodiments, based on a number of available resources changing, the system described herein may be used to update the number of groups formed.

Once machine learning subsystem 114 has updated the clustering model to sort messages into the updated set of groups, machine learning subsystem 114 may process the second plurality of messages to sort the second plurality of messages into the updated set of groups. For example, machine learning subsystem 114 may process the second messages based on having combined two or more groups of messages and based on having separated a particular group into two or more different groups.

In some embodiments, machine learning subsystem 114 may determine, using the second plurality of messages, an accuracy for each updated group of the updated set of groups. Machine learning subsystem 114 may determine the accuracy of each updated group by assessing how well the clustering model's output aligns with predefined expectations or ground truth, if available. For example, machine learning subsystem 114 may use external validation metrics like Adjusted Rand Index (ARI) or Normalized Mutual Information (NMI), which measure the similarity between the clustering results and a labeled dataset. In cases where labeled data is not available, machine learning subsystem 114 may use internal validation measures such as silhouette scores to gauge how distinct and cohesive the clusters are. Additionally, machine learning subsystem 114 may manually inspect a sample of messages from each cluster to ensure that they meaningfully correspond to the corresponding topic. Such qualitative assessments, coupled with quantitative metrics, may provide a comprehensive view of the clustering accuracy, allowing for adjustments to the model or its parameters if the clusters formed were found to be less accurate or meaningful.

In some embodiments, machine learning subsystem 114 may compare the accuracy to an accuracy threshold. For example, the accuracy threshold may be predetermined. In some embodiments, machine learning subsystem 114 may determine the accuracy threshold based on the purpose of the clustering and the implications of misclassification. For instance, in a high-stakes environment such as a legal or medical context, machine learning subsystem 114 may set a higher threshold for accuracy due to the critical nature of the information. The threshold may be determined based on historical data, expert input, or industry standards, aiming for a value that balances the need for precision and practical feasibility. Statistical analysis may also play a role, where machine learning subsystem 114 may analyze the distribution of internal validation metrics like silhouette scores across multiple runs of the model to identify a natural cutoff that distinguishes well-formed clusters from less cohesive ones.

In some embodiments, machine learning subsystem 114 may determine that a first accuracy for a first updated group does not satisfy the accuracy threshold. Communication subsystem 112 may determine that a functionality associated with a first updated topic of the first updated group has been terminated. For example, a cluster may relate to a social media feature of a product that has since been terminated. Machine learning subsystem 114 may, when updating the clustering model to sort the messages into the updated set of groups, exclude, from the first updated group, messages that pertain to the first updated topic. Machine learning subsystem 114 may then determine an updated accuracy for the first updated group and may determine that the updated accuracy for the first updated group satisfies the accuracy threshold.

In some embodiments, based on determining that a functionality associated with a first updated label of a first updated group has been terminated, machine learning subsystem 114 may modify the second plurality of messages to remove messages pertaining to the first updated label (e.g., social media). Machine learning subsystem 114 may then modify the updated model to sort the modified second plurality of messages into a new set of groups, the new set of groups corresponding to the set of resources available to process the messages. For example, machine learning subsystem 114 may update the clustering model to sort the messages—excluding the messages relating to the first updated label (e.g., social media)—into the same number of groups (e.g., equal to the number of processors available). Communication subsystem 112 may receive, via the messaging platform, a third plurality of messages from the users and machine learning subsystem 114 may process the third plurality of messages using the modified model to sort the third plurality of messages into the new set of groups.

In some embodiments, machine learning subsystem 114 may determine that a first accuracy for a first updated group does not satisfy the accuracy threshold. Communication subsystem 112 may determine that a functionality associated with a first updated label of the first updated group has been modified to relate to a second updated label. For example, a social media feature of the product has been modified to be a customer support chat. Machine learning subsystem 114 may update the clustering model to sort messages into the updated set of groups such that messages pertaining to the first updated label (e.g., social media) are sorted into a second updated group pertaining to the second updated label (e.g., customer support). Machine learning subsystem 114 may then determine an updated accuracy for the first updated group and may determine that the updated accuracy for the first updated group satisfies the accuracy threshold.

In some embodiments, machine learning subsystem 114 may determine that a first accuracy for a first updated group does not satisfy the accuracy threshold. Communication subsystem 112 may receive an indication of a new functionality that does not pertain to any updated labels of the updated set of groups. For example, a product may include a new social media feature. Machine learning subsystem 114 may supplement the second plurality of messages to include synthetic messages pertaining to the new functionality. Machine learning subsystem 114 may then modify the updated model to sort the supplemented second plurality of messages into a new set of groups. For example, the new set of groups may correspond in number to the set of resources available to process messages. Communication subsystem 112 may receive, via the messaging platform, a third plurality of messages from the users and machine learning subsystem 114 may process the third plurality of messages using the modified model to sort the third plurality of messages into the new set of groups.

Figure 7:
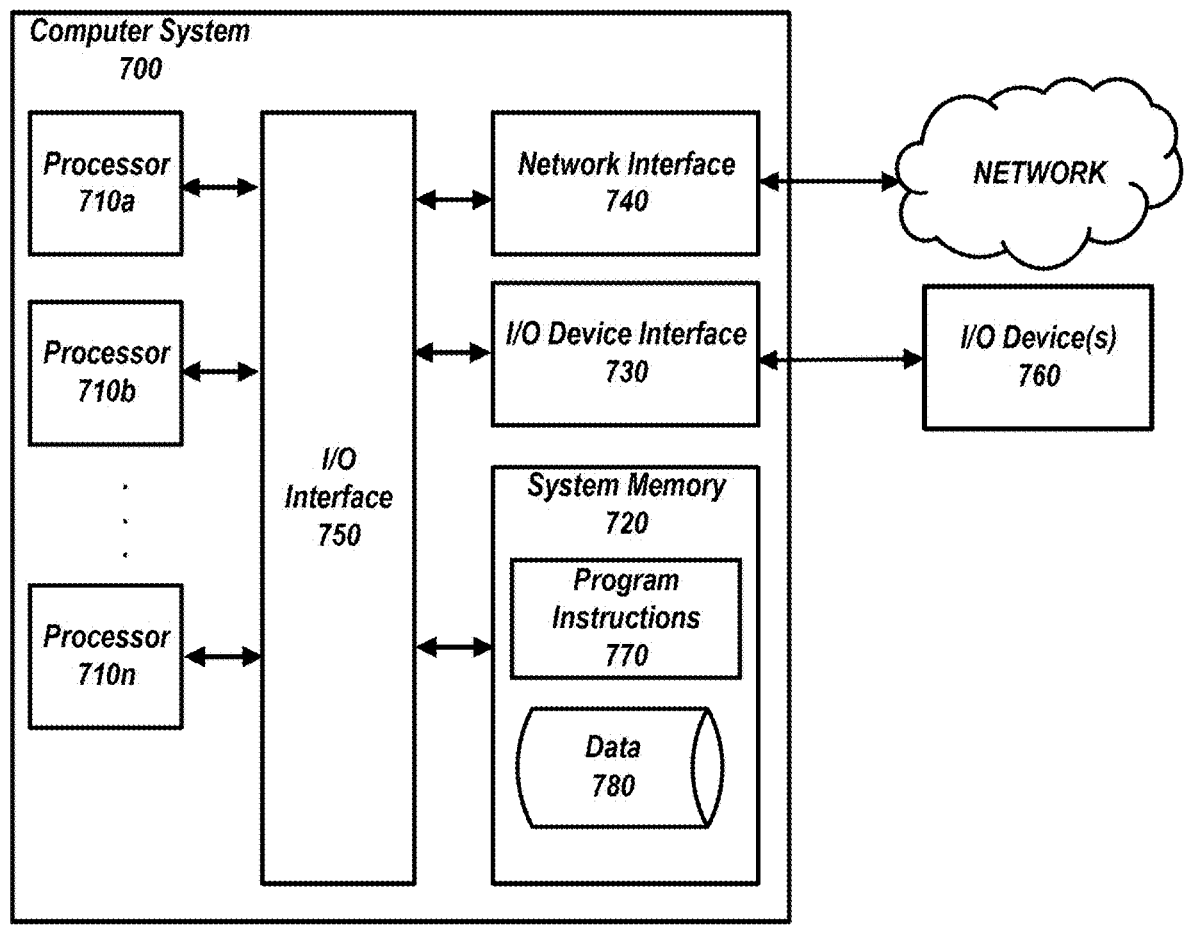
FIG. 7 illustrates a computing device, in accordance with one or more embodiments.

FIG. 7 shows an example computing system 700 that may be used in accordance with some embodiments of this disclosure. A person skilled in the art would understand that those terms may be used interchangeably. The components of FIG. 7 may be used to perform some or all operations discussed in relation to FIGS. 1-6. Furthermore, various portions of the systems and methods described herein may include or be executed on one or more computer systems similar to computing system 700. Further, processes and modules described herein may be executed by one or more processing systems similar to that of computing system 700.

Computing system 700 may include one or more processors (e.g., processors 710a-710n) coupled to system memory 720, an input/output (I/O) device interface 730, and a network interface 740 via an I/O interface 750. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a uni-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and an apparatus can also be implemented as, special purpose logic circuitry, for example, an FPGA (field-programmable gate array) or an ASIC (application-specific integrated circuit). Computing system 700 may include a plurality of computing devices (e.g., distributed computer systems) to implement various processing functions.

I/O device interface 730 may provide an interface for connection of one or more I/O devices 760 to computing system 700. I/O devices may include devices that receive input (e.g., from a user) or output information (e.g., to a user). I/O devices 760 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computing system 700 through a wired or wireless connection. I/O devices 760 may be connected to computing system 700 from a remote location. I/O devices 760 located on remote computer systems, for example, may be connected to computing system 700 via a network and network interface 740.

Network interface 740 may include a network adapter that provides for connection of computing system 700 to a network. Network interface 740 may facilitate data exchange between computing system 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 770 or data 780. Program instructions 770 may be executable by a processor (e.g., one or more of processors 710a-710n) to implement one or more embodiments of the present techniques. Program instructions 770 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 720 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 720 may include a non-transitory computer-readable storage medium that may have program instructions stored thereon that are executable by a computer processor (e.g., one or more of processors 710a-710n) to cause the subject matter and the functional operations described herein. A memory (e.g., system memory 720) may include a single memory device and/or a plurality of memory devices (e.g., distributed memory devices).

I/O interface 750 may be configured to coordinate I/O traffic between processors 710a-710n, system memory 720, network interface 740, I/O devices 760, and/or other peripheral devices. I/O interface 750 may perform protocol, timing, or other data transformations to convert data signals from one component (e.g., system memory 720) into a format suitable for use by another component (e.g., processors 710a-710n). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 700, or multiple computer systems 700 configured to host different portions or instances of embodiments. Multiple computer systems 700 may provide for parallel or sequential processing/execution of one or more portions of the techniques described herein.

Those skilled in the art will appreciate that computing system 700 is merely illustrative and is not intended to limit the scope of the techniques described herein. Computing system 700 may include any combination of devices or software that may perform or otherwise provide for the performance of the techniques described herein. For example, computing system 700 may include or be a combination of a cloud-computing system, a data center, a server rack, a server, a virtual server, a desktop computer, a laptop computer, a tablet computer, a server device, a user device, a mobile telephone, a personal digital assistant (PDA), a mobile audio or video player, a game console, a vehicle-mounted computer, a GPS, or the like. Computing system 700 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Figure 8:
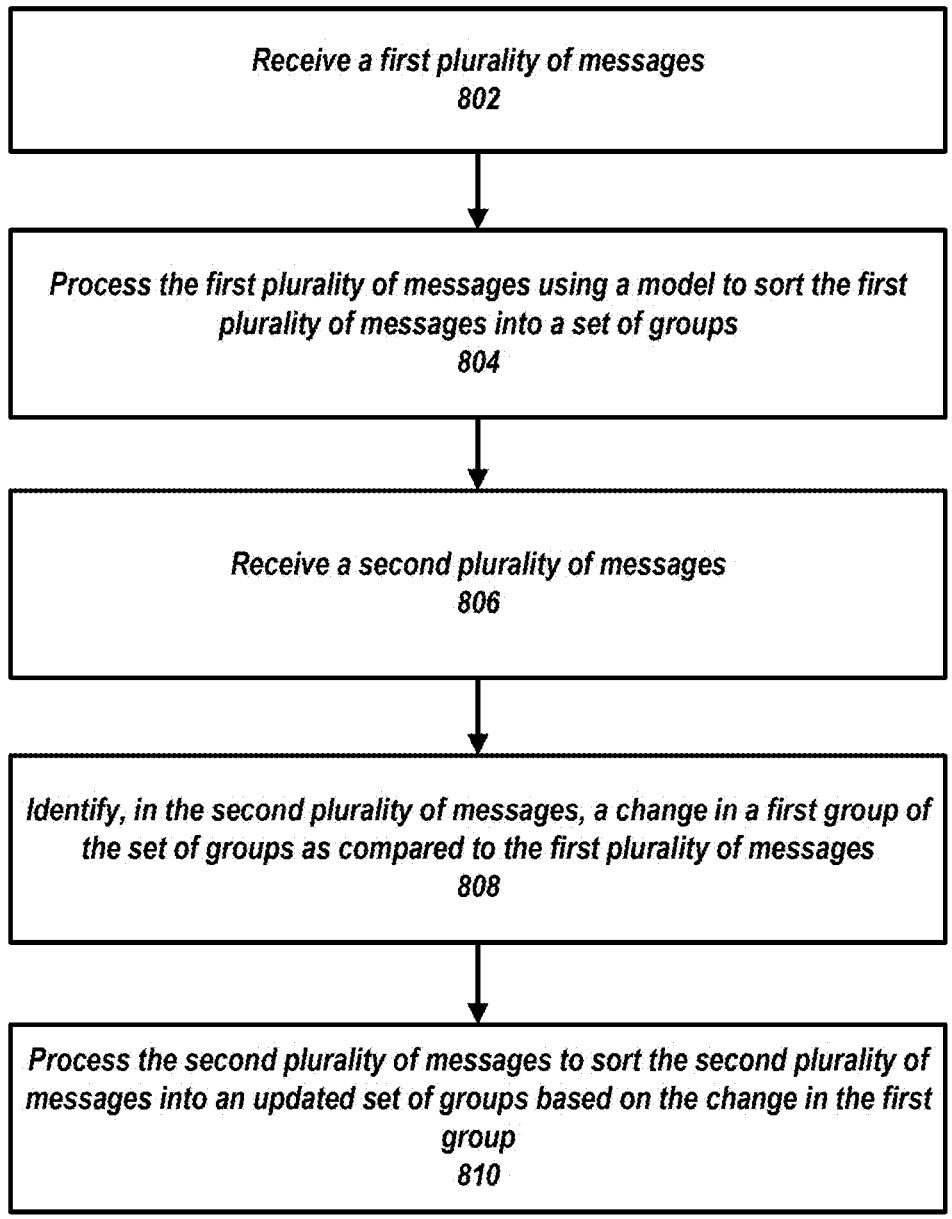
FIG. 8 shows a flowchart of the process for using clustering models to manage resources for processing messages, in accordance with one or more embodiments.

FIG. 8 shows a flowchart of the process 800 for using clustering models to manage resources for processing messages, in accordance with one or more embodiments. For example, the system may use process 800 (e.g., as implemented on one or more system components described above) to update sets of groups used by a clustering model to sort messages by topic.

At 802, resource management system 102 (e.g., using one or more of processors 710a-710n) may receive a first plurality of messages. The messages may require processing, such as responding to an issue or question in the message. In some embodiments, the first set of messages may relate to a number of topics. In some embodiments, resource management system 102 (e.g., communication subsystem 112) may receive the first messages from I/O devices 760 via the network.

At 804, resource management system 102 (e.g., using one or more of processors 710a-710n) may process the first plurality of messages, for example, using a model to sort the first plurality of messages into a set of groups. The model may be a clustering model trained to sort messages into the set of groups according to a plurality of topics. In some embodiments, resource management system 102 (e.g., communication subsystem 112) may process the first messages using one or more of processors 710a-710n.

At 806, resource management system 102 (e.g., using one or more of processors 710a-710n) may receive a second plurality of messages. The second set of messages may include messages received at a different time than the first set of messages. In some embodiments, the second set of messages may relate to similar topics as the first set of messages. In some embodiments, resource management system 102 (e.g., communication subsystem 112) may receive the second messages from I/O devices 760 via the network.

At 808, resource management system 102 (e.g., using one or more of processors 710a-710n) may identify, in the second plurality of messages, a change in a first group of the set of groups as compared to the first plurality of messages. For example, the change may be an increase in volume of messages received in the second plurality of messages as compared to the first plurality of messages. In some embodiments, resource management system 102 (e.g., communication subsystem 112) may identify the change in the first group using one or more of processors 710a-710n.

At 810, resource management system 102 (e.g., using one or more of processors 710a-710n) may process the second plurality of messages to sort the second plurality of messages into an updated set of groups. For example, the updated set of groups may reflect the change in the first group. For example, resource management system 102 may update the set of groups such that the at least two related groups form a combined group and the first group is separated into at least two separate groups. In some embodiments, resource management system 102 (e.g., communication subsystem 112) may process the second messages using one or more of processors 710a-710n.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 8.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising receiving, via a messaging platform, a first plurality of messages from a plurality of users, the first plurality of messages relating to a plurality of topics, processing the first plurality of messages using a clustering model to sort the first plurality of messages into a set of groups, the set of groups corresponding to a set of resources available to process messages, wherein the clustering model is trained to sort messages into the set of groups according to the plurality of topics, receiving, via the messaging platform, a second plurality of messages from the plurality of users, the second plurality of messages relating to the plurality of topics, identifying, in the second plurality of messages, an increase in volume of messages sorted into a first group of the set of groups as compared to the first plurality of messages, identifying, from the set of groups, at least two related groups having a combined message volume below a threshold volume and a distance metric below a threshold distance, wherein the distance metric measures similarity between groups sorted by the clustering model, updating the clustering model to sort messages into an updated set of groups such that the at least two related groups form a combined group and such that the first group is separated into at least two separate groups, and processing the second plurality of messages using the updated clustering model to sort the second plurality of messages into the updated set of groups.

2. A method comprising receiving, via a messaging platform, a first plurality of messages from a plurality of users, processing the first plurality of messages using a model to sort the first plurality of messages into a set of groups, the set of groups corresponding to a set of resources available to process messages, receiving, via the messaging platform, a second plurality of messages from the plurality of users, identifying, in the second plurality of messages, an increase in volume of messages sorted into a first group of the set of groups as compared to the first plurality of messages, identifying, from the set of groups, at least two related groups having a combined message volume below a threshold volume, updating the model to sort messages into an updated set of groups such that the at least two related groups form a combined group and such that the first group is separated into at least two separate groups, and processing the second plurality of messages using the updated model to sort the second plurality of messages into the updated set of groups.

3. A method comprising receiving, via a messaging platform, a first plurality of messages from a plurality of users, processing the first plurality of messages to sort the first plurality of messages into a set of groups, the set of groups corresponding to a set of resources available to process messages, receiving, via the messaging platform, a second plurality of messages from the plurality of users, identifying, in the second plurality of messages, a change in a first group of the set of groups as compared to the first plurality of messages, and processing the second plurality of messages to sort the second plurality of messages into an updated set of groups based on the change in the first group.

4. The method of any one of the preceding embodiments, wherein the first plurality of messages and the second plurality of messages relate to a plurality of topics, and wherein the model includes a clustering model trained to sort messages into the set of groups according to the plurality of topics.

5. The method of any one of the preceding embodiments, wherein the increase in volume of messages sorted into the first group is caused by an update to a functionality relating to a first topic, of the plurality of topics, associated with the first group.

6. The method of any one of the preceding embodiments, further comprising, for each group of the set of groups: analyzing one or more messages within the group to determine one or more topics of the plurality of topics that are relevant to the one or more messages within the group, and assigning, to the group, a label that reflects the one or more topics.

7. The method of any one of the preceding embodiments, further comprising, for each updated group of the updated set of groups, analyzing one or more messages within the updated group to determine one or more updated topics of the plurality of topics that are relevant to the one or more messages within the updated group, and assigning, to the updated group, an updated label that reflects the one or more updated topics.

8. The method of any one of the preceding embodiments, further comprising determining, using the second plurality of messages, an accuracy for each updated group of the updated set of groups, and determining that a first accuracy for a first updated group of the updated set of groups does not satisfy an accuracy threshold.

9. The method of any one of the preceding embodiments, further comprising determining that a functionality associated with a first updated topic of the first updated group has been terminated, updating the clustering model to sort the messages into the updated set of groups, wherein updating the clustering model comprises excluding, from the first updated group, a subset of the one or more messages that pertains to the first updated topic, determining, using the second plurality of messages, an updated accuracy for the first updated group, and determining that the updated accuracy for the first updated group satisfies the accuracy threshold.

10. The method of any one of the preceding embodiments, further comprising determining that a functionality associated with a first updated label of the first updated group has been modified to relate to a second updated label, updating the clustering model to sort messages into the updated set of groups such that a subset of the one or more messages that pertains to the first updated label is sorted into a second updated group pertaining to the second updated label, determining, using the second plurality of messages, an updated accuracy for the first updated group, and determining that the updated accuracy for the first updated group satisfies the accuracy threshold.

11. The method of any one of the preceding embodiments, further comprising determining that a functionality associated with a first updated label of a first updated group has been terminated, modifying the second plurality of messages to remove a subset of the one or more messages that pertains to the first updated label, modifying the updated model to sort the modified second plurality of messages into a new set of groups, the new set of groups corresponding to the set of resources available to process the messages, receiving, via the messaging platform, a third plurality of messages from the plurality of users, and processing the third plurality of messages using the modified model to sort the third plurality of messages into the new set of groups.

12. The method of any one of the preceding embodiments, further comprising receiving an indication of a new functionality that does not pertain to any updated labels of the updated set of groups, supplementing the second plurality of messages to include a plurality of synthetic messages pertaining to the new functionality, modifying the updated model to sort the supplemented second plurality of messages into a new set of groups, the new set of groups corresponding to the set of resources available to process messages, receiving, via the messaging platform, a third plurality of messages from the plurality of users, and processing the third plurality of messages using the modified model to sort the third plurality of messages into the new set of groups.

13. The method of any one of the preceding embodiments, wherein the at least two related groups comprise a distance metric below a threshold distance, and wherein the distance metric measures similarity between groups sorted by the model.

14. The method of any one of the preceding embodiments, wherein the change comprises an increase in volume of messages sorted into the first group of the set of groups as compared to the first plurality of messages.

15. One or more tangible, non-transitory, computer-readable media storing instructions that, when executed by a data processing apparatus, cause the data processing apparatus to perform operations comprising those of any of embodiments 1-14.

16. A system comprising one or more processors and memory storing instructions that, when executed by the processors, cause the processors to effectuate operations comprising those of any of embodiments 1-14.

17. A system comprising means for performing any of embodiments 1-14.

18. A system comprising cloud-based circuitry for performing any of embodiments 1-14.

What is claimed is:

1. A system for using clustering models to manage resources for processing messages received via one or more messaging platforms, the system comprising:
   one or more processors; and
   one or more non-transitory, computer-readable media having computer-executable instructions stored thereon that, when executed by the one or more processors, cause the system to perform operations comprising:
      receiving, via a messaging platform, a first plurality of messages from a plurality of users, the first plurality of messages relating to a plurality of topics;
      processing the first plurality of messages using a clustering model to sort the first plurality of messages into a set of groups, the set of groups corresponding to a set of resources available to process messages, wherein the clustering model is trained to sort messages into the set of groups according to the plurality of topics;
      receiving, via the messaging platform, a second plurality of messages from the plurality of users, the second plurality of messages relating to the plurality of topics;
      identifying, in the second plurality of messages, an increase in volume of messages sorted into a first group of the set of groups as compared to the first plurality of messages;
      identifying, from the set of groups, at least two related groups having a combined message volume below a threshold volume and a distance metric below a threshold distance, wherein the distance metric measures similarity between groups sorted by the clustering model;
      updating the clustering model to sort messages into an updated set of groups such that the at least two related groups form a combined group and such that the first group is separated into at least two separate groups; and
      processing the second plurality of messages using the updated clustering model to sort the second plurality of messages into the updated set of groups.

2. A method comprising:
   receiving, via a messaging platform, a first plurality of messages from a plurality of users;
   processing the first plurality of messages using a model to sort the first plurality of messages into a set of groups, the set of groups corresponding to a set of resources available to process messages;

receiving, via the messaging platform, a second plurality of messages from the plurality of users;

identifying, in the second plurality of messages, an increase in volume of messages sorted into a first group of the set of groups as compared to the first plurality of messages;

identifying, from the set of groups, at least two related groups having a combined message volume below a threshold volume;

updating the model to sort messages into an updated set of groups such that the at least two related groups form a combined group and such that the first group is separated into at least two separate groups; and processing the second plurality of messages using the updated model to sort the second plurality of messages into the updated set of groups.

3. The method of claim 2, wherein the first plurality of messages and the second plurality of messages relate to a plurality of topics, and wherein the model includes a clustering model trained to sort messages into the set of groups according to the plurality of topics.

4. The method of claim 3, wherein the increase in volume of messages sorted into the first group is caused by an update to a functionality relating to a first topic, of the plurality of topics, associated with the first group.

5. The method of claim 3, further comprising, for each group of the set of groups:

analyzing one or more messages within the group to determine one or more topics of the plurality of topics that are relevant to the one or more messages within the group; and assigning, to the group, a label that reflects the one or more topics.

6. The method of claim 3, further comprising, for each updated group of the updated set of groups:

analyzing one or more messages within the updated group to determine one or more updated topics of the plurality of topics that are relevant to the one or more messages within the updated group; and assigning, to the updated group, an updated label that reflects the one or more updated topics.

7. The method of claim 6, further comprising:

determining, using the second plurality of messages, an accuracy for each updated group of the updated set of groups; and determining that a first accuracy for a first updated group of the updated set of groups does not satisfy an accuracy threshold.

8. The method of claim 7, further comprising:

determining that a functionality associated with a first updated topic of the first updated group has been terminated;

updating the clustering model to sort the messages into the updated set of groups, wherein updating the clustering model comprises excluding, from the first updated group, a subset of the one or more messages that pertains to the first updated topic;

determining, using the second plurality of messages, an updated accuracy for the first updated group; and determining that the updated accuracy for the first updated group satisfies the accuracy threshold.

9. The method of claim 7, further comprising:

determining that a functionality associated with a first updated label of the first updated group has been modified to relate to a second updated label;

updating the clustering model to sort messages into the updated set of groups such that a subset of the one or more messages that pertains to the first updated label is sorted into a second updated group pertaining to the second updated label;

determining, using the second plurality of messages, an updated accuracy for the first updated group; and determining that the updated accuracy for the first updated group satisfies the accuracy threshold.

10. The method of claim 6, further comprising:

determining that a functionality associated with a first updated label of a first updated group has been terminated;

modifying the second plurality of messages to remove a subset of the one or more messages that pertains to the first updated label;

modifying the updated model to sort the modified second plurality of messages into a new set of groups, the new set of groups corresponding to the set of resources available to process the messages;

receiving, via the messaging platform, a third plurality of messages from the plurality of users; and processing the third plurality of messages using the modified model to sort the third plurality of messages into the new set of groups.

11. The method of claim 6, further comprising:

receiving an indication of a new functionality that does not pertain to any updated labels of the updated set of groups;

supplementing the second plurality of messages to include a plurality of synthetic messages pertaining to the new functionality;

modifying the updated model to sort the supplemented second plurality of messages into a new set of groups, the new set of groups corresponding to the set of resources available to process messages;

receiving, via the messaging platform, a third plurality of messages from the plurality of users; and processing the third plurality of messages using the modified model to sort the third plurality of messages into the new set of groups.

12. The method of claim 2, wherein the at least two related groups comprise a distance metric below a threshold distance, and wherein the distance metric measures similarity between groups sorted by the model.

13. One or more non-transitory, computer-readable media storing instructions that, when executed by one or more processors, cause operations comprising:

receiving, via a messaging platform, a first plurality of messages from a plurality of users;

processing the first plurality of messages to sort the first plurality of messages into a set of groups, the set of groups corresponding to a set of resources available to process messages;

receiving, via the messaging platform, a second plurality of messages from the plurality of users;

identifying, in the second plurality of messages, a change in a first group of the set of groups as compared to the first plurality of messages; and processing the second plurality of messages to sort the second plurality of messages into an updated set of groups based on the change in the first group.

14. The one or more non-transitory, computer-readable media of claim 13, wherein the change comprises an increase in volume of messages sorted into the first group of the set of groups as compared to the first plurality of messages.

15. The one or more non-transitory, computer-readable media of claim 14, wherein a clustering model is used to process the first plurality of messages to sort the first plurality of messages into the set of groups, wherein the instructions further cause the one or more processors to perform operations comprising:

identifying, from the set of groups, at least two related groups having a combined message volume below a threshold volume; and updating the clustering model to sort the messages into the updated set of groups such that the at least two related groups form a combined group and such that the first group is separated into at least two separate groups.

16. The one or more non-transitory, computer-readable media of claim 15, wherein the first plurality of messages and the second plurality of messages relate to a plurality of topics, and wherein the clustering model is trained to sort messages into the set of groups according to the plurality of topics.

17. The one or more non-transitory, computer-readable media of claim 16, wherein the change in the first group is caused by an update to a functionality relating to a first topic, of the plurality of topics, associated with the first group.

18. The one or more non-transitory, computer-readable media of claim 16, wherein the instructions further cause the one or more processors to perform operations comprising, for each group of the set of groups:

analyzing one or more messages within the group to determine one or more topics of the plurality of topics that are relevant to the one or more messages within the group; and assigning, to the group, a label that reflects the one or more topics.

19. The one or more non-transitory, computer-readable media of claim 16, wherein the instructions further cause the one or more processors to perform operations comprising, for each updated group of the updated set of groups:

analyzing one or more messages within the updated group to determine one or more updated topics of the plurality of topics that are relevant to the one or more messages within the updated group; and assigning, to the updated group, an updated label that reflects the one or more updated topics.

20. The one or more non-transitory, computer-readable media of claim 15, wherein the instructions further cause the one or more processors to perform operations comprising:

receiving an indication of a new functionality that does not pertain to any updated labels of the updated set of groups;

supplementing the second plurality of messages to include a plurality of synthetic messages pertaining to the new functionality;

modifying the updated clustering model to sort the supplemented second plurality of messages into a new set of groups, the new set of groups corresponding to the set of resources available to process messages;

receiving, via the messaging platform, a third plurality of messages from the plurality of users; and processing the third plurality of messages using the modified clustering model to sort the third plurality of messages into the new set of groups.

\* \* \* \* \*